United States Patent
Kwak et al.

(10) Patent No.: US 9,384,899 B2
(45) Date of Patent: Jul. 5, 2016

(54) TANTALUM CAPACITOR AND METHOD OF MANUFACTURING THE SAME

(71) Applicant: SAMSUNG ELECTRO-MECHANICS CO., LTD., Suwon-Si, Gyeonggi-Do (KR)

(72) Inventors: Sung Ho Kwak, Suwon-Si (KR); Hun Chol Jung, Suwon-Si (KR); Jeong Oh Hong, Suwon-Si (KR); Sung Soo Cha, Suwon-Si (KR); Hee Dong Myung, Suwon-Si (KR); Hee Sung Choi, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 17 days.

(21) Appl. No.: 14/196,948

(22) Filed: Mar. 4, 2014

(65) Prior Publication Data

US 2015/0131206 A1  May 14, 2015

(30) Foreign Application Priority Data

Nov. 8, 2013 (KR) .................. 10-2013-0135333

(51) Int. Cl.
*H01G 9/012* (2006.01)
*H01G 9/042* (2006.01)
(Continued)

(52) U.S. Cl.
CPC ............... *H01G 9/042* (2013.01); *H01G 4/228* (2013.01); *H01G 4/32* (2013.01); *H01G 9/004* (2013.01); *H01G 9/0029* (2013.01); *H01G 9/012* (2013.01); *H01G 9/0525* (2013.01)

(58) Field of Classification Search
CPC ....... H01G 9/004; H01G 9/008; H01G 9/012; H01G 9/042; H01G 4/32; H01G 4/228

USPC ......... 361/532–525, 528–529, 530, 535–536, 361/538, 540–541, 508–509, 516–519
See application file for complete search history.

(56) References Cited

U.S. PATENT DOCUMENTS 6,236,561 B1 * 5/2001 Ogino .................. H01G 9/012
361/301.3
6,751,086 B2 6/2004 Matsumoto
(Continued)

FOREIGN PATENT DOCUMENTS

JP       6-177308 A     6/1994
JP    2001-110676 A    4/2001
(Continued)

OTHER PUBLICATIONS

Korean Office Action dated Apr. 10, 2015, issued in corresponding Korean Patent Application No. 10-2013-0135333. (w/ English translation).

(Continued)

*Primary Examiner* — Nguyen T Ha
(74) *Attorney, Agent, or Firm* — McDermott Will & Emery LLP

(57) ABSTRACT

A tantalum capacitor may include: a capacitor body containing a tantalum powder and having a tantalum wire exposed to one end surface thereof; a positive electrode lead frame including a positive electrode terminal part, a vertical support part vertically extended from one leading edge of the positive electrode terminal part, and a positive electrode connection part extended from the vertical support part toward the positive electrode terminal part and connected to the tantalum wire; a negative electrode lead frame having the capacitor body mounted on an upper surface thereof; and a molding part formed to allow a lower surface of the positive electrode terminal part of the positive electrode lead frame and a lower surface of the negative electrode lead frame to be exposed, while enclosing the capacitor body.

14 Claims, 5 Drawing Sheets

(51) Int. Cl.
*H01G 9/052* (2006.01)
*H01G 9/00* (2006.01)
*H01G 4/228* (2006.01)
*H01G 9/004* (2006.01)
*H01G 4/32* (2006.01)

(56) References Cited

U.S. PATENT DOCUMENTS

| | | | |
|---|---|---|---|
| 7,113,391 B2* | 9/2006 | Ishida | H01G 2/06 361/533 |
| 7,468,882 B2 | 12/2008 | Marek et al. | |
| 7,542,267 B2* | 6/2009 | Ishijima | H01G 2/065 29/25.01 |
| 7,869,190 B2* | 1/2011 | Matsuoka | H01G 2/06 361/528 |
| 8,094,434 B2* | 1/2012 | Rawal | H01G 2/12 361/536 |
| 8,279,583 B2* | 10/2012 | Zednicek | H01G 9/052 361/528 |
| 2008/0080124 A1 | 4/2008 | Kim et al. | |
| 2010/0010359 A1 | 1/2010 | Kenigsberg et al. | |
| 2010/0302712 A1 | 12/2010 | Zednicek et al. | |

FOREIGN PATENT DOCUMENTS

| | | |
|---|---|---|
| JP | 2005-093820 A | 4/2005 |
| JP | 2007300123 A | 11/2007 |
| JP | 2007-317976 A | 12/2007 |
| JP | 2010-109005 A | 5/2010 |
| JP | 2010-278446 A | 12/2010 |
| KR | 1020080029203 A | 4/2008 |

OTHER PUBLICATIONS

Japanese Office Action dated Sep. 29, 2015 issued in Japanese Patent Application No. 2014-033624 (English translation).

* cited by examiner

TANTALUM CAPACITOR AND METHOD OF MANUFACTURING THE SAME

CROSS-REFERENCE TO RELATED APPLICATION

This application claims the benefit of Korean Patent Application No. 10-2013-0135333 filed on Nov. 8, 2013, with the Korean Intellectual Property Office, the disclosure of which is incorporated herein by reference.

BACKGROUND

The present disclosure relates to a tantalum capacitor and a method of manufacturing the same.

A tantalum (Ta) material is a metal widely used in various industrial fields such as space and military fields, and the like, as well as electrical, mechanical, and chemical fields due to mechanical or physical properties thereof such as a high melting point, excellent flexibility and corrosion-resistance, and the like.

Since such a tantalum material may form a stable anodic oxide film, the tantalum material has been widely used as a positive electrode material of a small capacitor. Recently, in accordance with the rapid development of information technology (IT) industries such as electronic and info-communications industries, the amount of tantalum used has been rapidly increased every year.

Generally, a capacitor refers to a condenser temporarily storing electricity therein and is a component in which two flat plate electrodes insulating from each other are allowed to approach each other, while having a dielectric substance interposed therebetween, and electrical charges are charged and accumulated therein by attractive force. Such a capacitor may store electric charges and electrical fields in a space formed by two conductors, and may be used to obtain capacitance.

A tantalum capacitor using the tantalum material has a structure using an empty gap generated at the time of sintering and hardening a tantalum power and may be completed by forming a tantalum oxide ($Ta_2O_5$) on a tantalum surface using an anodic oxidation method, forming a manganese dioxide ($MnO_2$) layer, which is an electrolyte, on the tantalum oxide serving as a dielectric substance, forming a carbon layer and a metal layer on the manganese dioxide layer to form a body, forming positive and negative electrodes on the body to mount the electrodes on a circuit board, and forming a molding part.

A tantalum capacitor according to the related art has a structure in which a terminal is exposed to the outside using an internal lead frame or without the frame in order to connect the tantalum material and an electrode to each other.

In the case of a structure using internal lead frames, a space occupied by the tantalum material in the molding part may be decreased by the internal lead frames configuring the positive and negative electrodes, and a limitation in capacitance may be caused since the capacitance is in proportion to a volume of the tantalum material.

In the case of the structure in which the terminal is exposed to the outside without the frame, since a plurality of materials in contact with the tantalum material are present, contact resistance is increased by the plurality of contact materials, such that equivalent series resistance (ESR) of the capacitor may be increased.

Further, in the case of the structure in which the terminal is exposed to the outside without the frame, since a negative electrode terminal is positioned at a side of a product, a welding distance for forming a solder needs to be secured between the tantalum material and the negative electrode terminal, such that an internal volume ratio of the tantalum material may be decreased. Therefore, the capacitance may be decreased.

SUMMARY

An aspect of the present disclosure may provide a tantalum capacitor capable of improving capacitance while implementing low ESR, and solving a welding defect between a tantalum wire and a positive electrode lead frame.

According to an aspect of the present disclosure, a tantalum capacitor may include: a capacitor body containing a tantalum powder and having a tantalum wire exposed to one end surface thereof; a positive electrode lead frame including a positive electrode terminal part, a vertical support part vertically extended from one leading edge of the positive electrode terminal part, and a positive electrode connection part extended from the vertical support part toward the positive electrode terminal part and connected to the tantalum wire; a negative electrode lead frame having the capacitor body mounted on an upper surface thereof; and a molding part formed to allow a lower surface of the positive electrode terminal part of the positive electrode lead frame and a lower surface of the negative electrode lead frame to be exposed, while enclosing the capacitor body.

The positive electrode lead frame may have a groove part such that the molding part is formed between the positive electrode terminal part and the positive electrode connection part.

The positive electrode lead frame may have a first extension part in a width direction of the capacitor.

The negative electrode lead frame may have a jaw part formed on a portion of the lower surface thereof such that the molding part is formed thereon.

The negative electrode lead frame may have a second extension part to increase a contact area thereof with the capacitor body.

The capacitor body and the negative electrode lead frame may have a conductive adhesive layer formed therebetween.

The conductive adhesive layer may contain an epoxy-based thermosetting resin and a conductive metal powder.

According to another aspect of the present disclosure, a method of manufacturing a tantalum capacitor may include: preparing a positive electrode lead frame having a positive electrode terminal part and a positive electrode connection part by, first, inwardly bending a portion of the first conductive metal plate to be erected in a vertical direction, and second, bending the first conductive metal plate such that the portion thereof erected in a vertical direction is inwardly disposed; preparing a negative electrode lead frame formed of a second conductive metal plate; disposing the positive and negative electrode lead frames in parallel to face each other; mounting a capacitor body containing a tantalum powder and having a tantalum wire exposed to one end surface thereof on an upper surface of the negative electrode lead frame, and connecting the tantalum wire of the capacitor body to the positive electrode connection part of the positive electrode lead frame; and forming a molding part by molding a circumference of the capacitor body using a resin in such a manner that a lower surface of the positive electrode terminal part of the positive electrode lead frame and a lower surface of the negative electrode lead frame are exposed.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
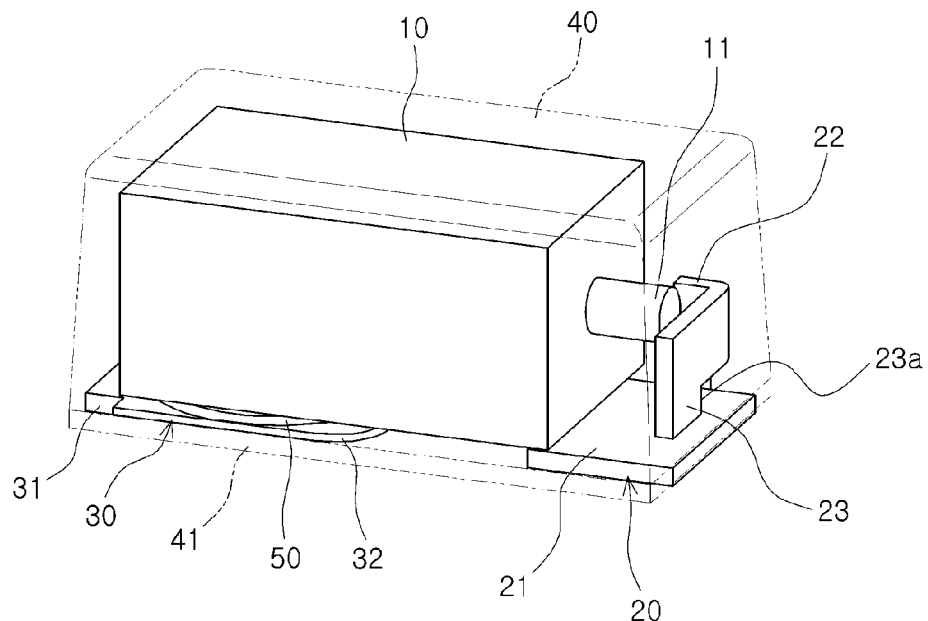
FIG. 1 is a transparent perspective view schematically showing a tantalum capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Further, in the exemplary embodiment, for the convenience of explanation, a direction in which a tantalum wire is exposed from a capacitor body is defined as a forward direction, a direction opposite to the forward direction is defined as a backward direction, directions perpendicular to the forward and backward directions are defined as both lateral directions, and both surfaces of the capacitor body in a thickness direction are defined as an upper surface and a lower surface (or a mounting surface) thereof.

Figure 2:
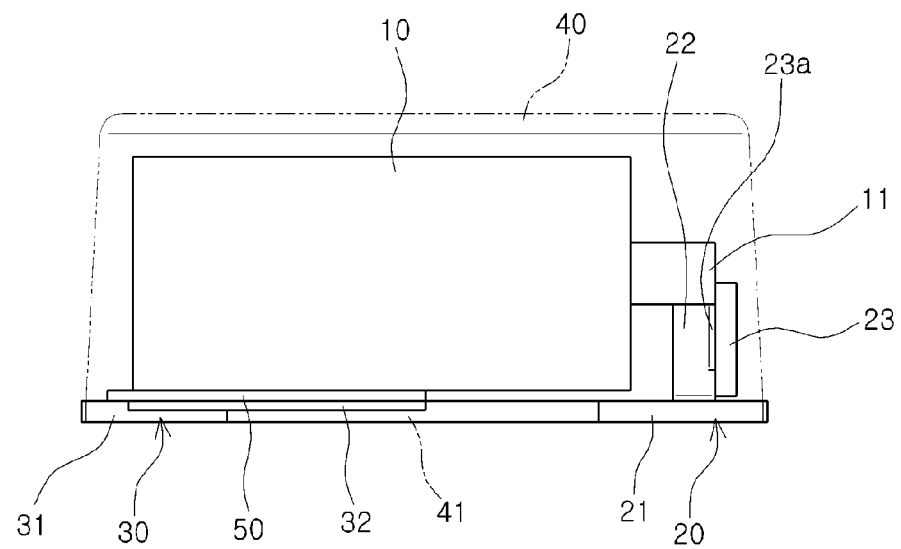
FIG. 2 is a side view showing a schematic structure of the tantalum capacitor according to the exemplary embodiment of the present disclosure.
Figure 3:
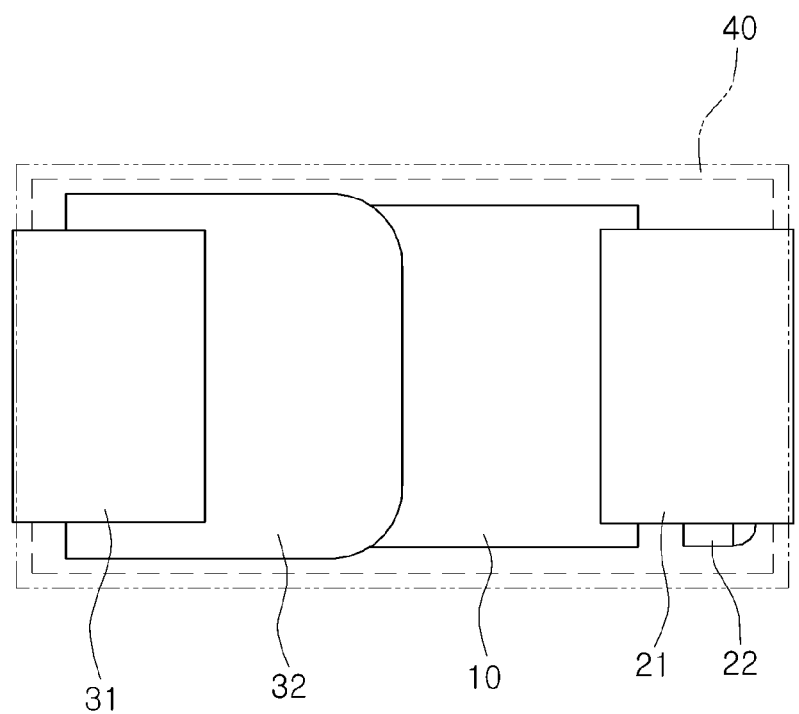
FIG. 3 is a bottom view of FIG. 1.

FIG. 1 is a transparent perspective view schematically showing a tantalum capacitor according to an exemplary embodiment of the present disclosure, FIG. 2 is a side view showing a schematic structure of the tantalum capacitor according to the exemplary embodiment of the present disclosure, and FIG. 3 is a bottom view of FIG. 1.

Referring to FIGS. 1 through 3, the tantalum capacitor according to the exemplary embodiment may include a capacitor body 10; a positive electrode lead frame 20; a negative electrode lead frame 30, and a molding part 40.

The capacitor body 10 may be formed using a tantalum material. For example, the capacitor body 10 may be manufactured by mixing a tantalum powder and a binder at a predetermined ratio, stirring and compressing the mixture to form a rectangular parallelepiped body, and then sintering the formed rectangular parallelepiped body at a high temperature under high vacuum atmosphere.

In addition, the capacitor body 10 may have a tantalum wire 11 exposed in the forward direction.

The tantalum wire 11 may be inserted into the mixture of the tantalum powder and the binder so as to be eccentric from the center of the capacitor, prior to the compressing of the mixture of the tantalum powder and the binder.

That is, the capacitor body 10 may be manufactured by inserting the tantalum wire 11 into the tantalum powder mixed with the binder to form a tantalum element having a desired size and then sintering the tantalum element at about 1,000 to 2,000° C. under high vacuum atmosphere ($10^{-5}$ torr or less) for about 30 minutes.

In this case, if necessary, carbon and silver (Ag) may be applied onto surfaces of the capacitor body 10.

Carbon may be provided to decrease contact resistance on the surfaces of the capacitor body 10, and silver may be provided to improve electrical connectivity with the negative electrode lead frame 30.

The positive electrode lead frame 20 may be formed of a first conductive metal plate including a conductive metal such as a nickel/iron alloy, or the like, and include a positive electrode terminal part 21, a vertical support part 22, and a positive electrode connection part 23.

The positive electrode terminal part 21 may be exposed to a lower surface of the molding part 40 and may be used as a connection terminal for electric connection with another electronic product.

In addition, the positive electrode terminal part 21 may have a first extension part (not shown) having an area extended in a width direction of the capacitor. The first extension part may serve to increase adhesive strength with the molding part 40.

The vertical support part 22 may be vertically extended from one leading edge of the positive electrode terminal part 21, and the positive electrode connection part 23 may be extended from the vertical support part 22 toward the positive electrode terminal part 21 and connected to an exposed portion of the tantalum wire 11 on an inner surface thereof to thereby be electrically connected to the tantalum wire 11.

In this case, the molding part 40 may be formed in a groove part 23a formed by bending the vertical support part 22 and the positive electrode connection part 23 in the first conductive metal plate, at the time of molding a resin to thereby improve adhesive strength of the positive electrode lead frame 20 and prevent cracks.

In addition, the inner surface of the positive electrode connection part 23 and the tantalum wire 11 may be attached to each other, for example, by electrical welding, or the like. Particularly, the electric welding may be performed by an electric spot welding method, but the present disclosure is not limited thereto.

Therefore, a bonding part between the positive electrode connection part 23 and the tantalum wire 11 may be stably bonded to each other, such that reliability and electrical conductivity may be improved.

In the exemplary embodiment, since the positive electrode connection part 23 may be formed by inwardly bending portions of the first conductive metal plate twice, the positive electrode connection part 23 may be positioned at an accurate position according to the intended design thereof, such that a variation between an actual process and the design may be significantly decreased.

Further, a volume of the molding part 40 corresponding to the exposed portion of the tantalum wire 11 of the capacitor body 10 may be significantly decreased, and a size of the capacitor body 10 may be increased by an amount equal to the decrease in volume of the molding part 40 as described above, thereby relatively increasing volumetric efficiency of the capacitor body 10. In addition, a length of a current path connected between the positive electrode lead frame 20 and the negative electrode lead frame 30 may be decreased, such that electrical resistance characteristics such as equivalent series resistance (ESR) may be further improved.

Meanwhile, although the case in which the positive electrode terminal part 21 and the positive electrode connection part 23 of the positive electrode lead frame 20 are formed integrally with each other is described in this exemplary embodiment, the present disclosure is not limited thereto. If necessary, the positive electrode terminal part 21, the vertical support part 22, and the positive electrode connection part 23 may be individually manufactured and then attached to each other by welding or the like.

The negative electrode lead frame 30 may be formed of a conductive metal such as a nickel/iron alloy, or the like, and include a negative electrode terminal part 31 and a negative electrode connection part 32.

The negative electrode terminal part 31 may be spaced apart from the positive electrode terminal part 21 of the positive electrode lead frame 20 to be parallel thereto, and a lower surface thereof may be exposed to the lower surface of the molding part 40 to thereby be used as a connection terminal for electric connection with another electronic product.

The negative connection part 32, a portion positioned on an upper surface of the negative electrode terminal part 31, may be flat in order to secure a bonding surface between the negative connection part 32 and the capacitor body 10, and the capacitor body 10 may be mounted thereon to thereby be electrically connected thereto.

In this case, the negative electrode connection part 32 and the negative electrode terminal part 31 may be integrated with each other or individually manufactured and attached to each other.

In addition, the negative electrode connection part 32 may have an area larger than that of the negative electrode terminal part 31 to thereby serve as a second extension part having an increased contact area with the capacitor body 10.

Further, the negative electrode lead frame 30 may have a jaw part formed on a portion of the lower surface thereof such that the molding part 40 is formed thereon.

In this exemplary embodiment, the negative electrode terminal part 31 and the negative electrode connection part 32 of the negative electrode lead frame 30 may be stepped in a vertical direction, such that the negative electrode lead frame 30 has a structure of the jaw part, but the present disclosure is not limited thereto.

For example, the structure of the jaw part is formed in a process of wet-etching a second conductive metal plate configuring the negative electrode lead frame 30 in order to expose the negative electrode terminal part 31 to the lower surface of the molding part 40. In the second conductive metal plate configuring the negative electrode lead frame 30, a portion thereof exposed to the lower surface of the molding part 40 after the etching may become the negative electrode terminal part 31, and another portion thereof positioned in the molding part 40 may become the negative electrode connection part 32, through the wet-etching process.

A conductive adhesive layer 50 may be formed between the negative electrode connection part 32 of the negative electrode lead frame 30 and the capacitor body 10 in order to improve adhesive strength of the negative electrode lead frame 30.

In addition, the conductive adhesive layer 50 may be formed, for example, by a dispensing method using a predetermined amount of a conductive adhesive containing an epoxy-based thermosetting resin and a conductive metal powder or by a dotting method using the conductive adhesive, but the present disclosure is not limited thereto.

In addition, as a conductive metal power, silver (Ag) may be used, but the present disclosure is not limited thereto.

The molding part 40 may be formed by transfer molding a resin such as an epoxy molding compound (EMC), or the like, to enclose the capacitor body 10.

The molding part 40 may serve to protect the tantalum wire 11 and the capacitor body 10 from the outside.

In this case, the molding part 40 may be formed such that the lower surface of the positive electrode terminal part 21 of the positive electrode lead frame 20 and the lower surface of the negative electrode terminal part 31 of the negative electrode lead frame 30 are exposed.

Generally, as the volume of the capacitor body is increased in the structure of the tantalum capacitor, the capacitance of the capacitor may be also increased, but a physical volume is increased, such that there is a limitation in miniaturizing an element.

In the exemplary embodiment, since the positive electrode connection part 23 of the positive electrode lead frame 20 may be formed by inwardly bending portions of the first conductive metal plate twice, the volume of the molding part 40 corresponding to the exposed portion of the tantalum wire 11 of the capacitor body 10 may be significantly decreased, such that the size of the capacitor body 10 may be increased by an amount equal to the decrease in volume of the molding part 40 as described above, thereby increasing the capacitance.

In addition, since a solder formed between a capacitor body and a negative electrode lead frame according to the related art may be omitted, the size of the capacitor body 10 may be increased by an amount equal to an area of the solder omitted as described above, thereby increasing the capacitance.

FIGS. 4A through 4D are side cross-sectional views sequentially showing a manufacturing process of the tantalum capacitor according to an exemplary embodiment of the present disclosure.

Hereinafter, a method of manufacturing a tantalum capacitor according to an exemplary embodiment of the present disclosure will be described with reference to FIGS. 4A through 4D.

Figure 4A:
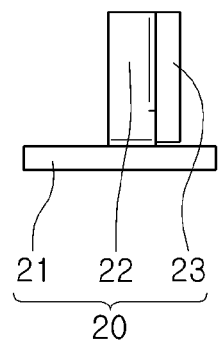
FIGS. 4A through 4D are side cross-sectional views sequentially showing a manufacturing process of the tantalum capacitor according to an exemplary embodiment of the present disclosure.

Referring to FIG. 4A, the positive electrode lead frame 20 including the positive electrode terminal part 21 and the positive electrode connection part 23 may be prepared using the first conductive metal plate having a flat plate shape.

Figure 5A:
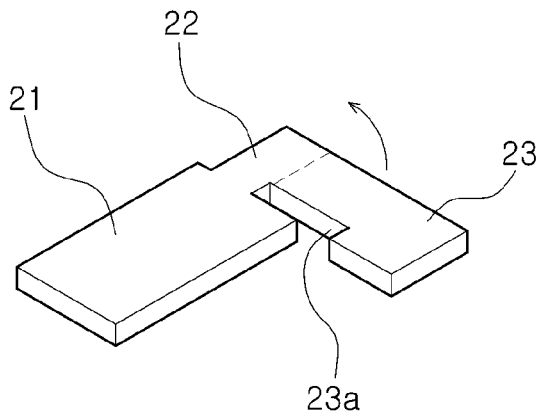
FIGS. 5A through 5C are perspective views sequentially showing a manufacturing process of a positive electrode lead frame of the tantalum capacitor according to the exemplary embodiment of the present disclosure.
Figure 5B:
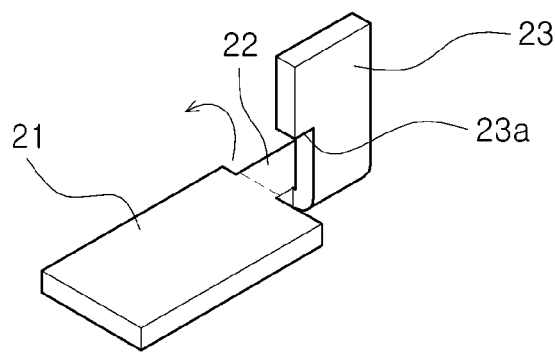
Figure 5C:
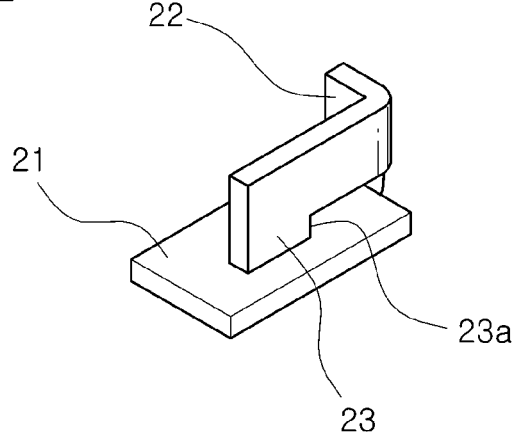

As shown in FIGS. 5A through 5C, the positive electrode lead frame 20 may be formed by, first inwardly bending a portion, one end portion of the first conductive metal plate to be erected in a vertical direction, and second, bending the first conductive metal plate such that the end portion thereof erected in a vertical direction is inwardly disposed, thereby forming the positive electrode connection part 23.

An inner surface of the positive electrode connection part 23 may be connected to an exposed portion of a tantalum wire to thereby be electrically connected to each other, and a portion of the positive electrode connection part 23 positioned at a bottom surface in the first conductive metal plate may be configured as the positive electrode terminal part 21.

In this case, the groove part 23a may be formed between the positive electrode terminal part 21 and the positive electrode connection part 23 of the positive electrode lead frame 20, such that the molding part 40 may fill the groove part 23a with a resin at the time of molding the resin.

Figure 4B:
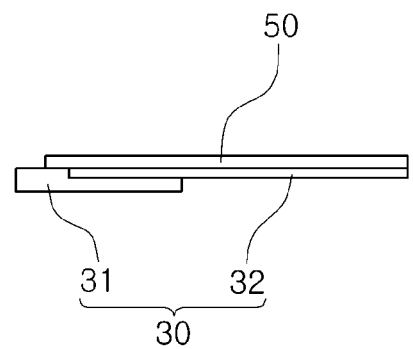

Referring to FIG. 4B, the negative electrode lead frame 30 including the negative electrode terminal part 31 and the negative electrode connection part 32 may be prepared using the second conductive metal plate having a flat plate shape.

In this case, the negative electrode lead frame 30 may have a jaw part formed by wet-etching a lower surface of the second conductive metal plate.

In this exemplary embodiment, the negative electrode lead frame 30 may be divided into the negative electrode terminal part 31 and the negative electrode connection part 32 by the jaw part as described above.

The jaw part may allow the molding part to be partially formed on a lower surface of the negative electrode lead frame 30 at the time of molding a circumference of a capacitor body to be described below using a resin to thereby improve adhesive strength between the negative electrode lead frame 30 and the molding part.

In addition, the negative electrode connection part 32 of the negative electrode lead frame 30 may be configured as the second extension part having an area wider than that of the negative electrode terminal part 31, such that a contact area thereof with a capacitor body to be described below may be increased.

As described above, in this exemplary embodiment, unlike the related art, since a process of bending or warping the conductive metal plate in order to manufacture the negative electrode lead frame is omitted, a manufacturing process may be significantly simplified.

Meanwhile, the positive electrode lead frame 20 and negative electrode lead frame 30 may be formed such that the positive electrode terminal part 21 and negative electrode terminal part 31 exposed to a substrate through the lower surfaces thereof have a symmetrical structure in order to secure soldering stability at the time of mounting the capacitor on the substrate.

Figure 4C:
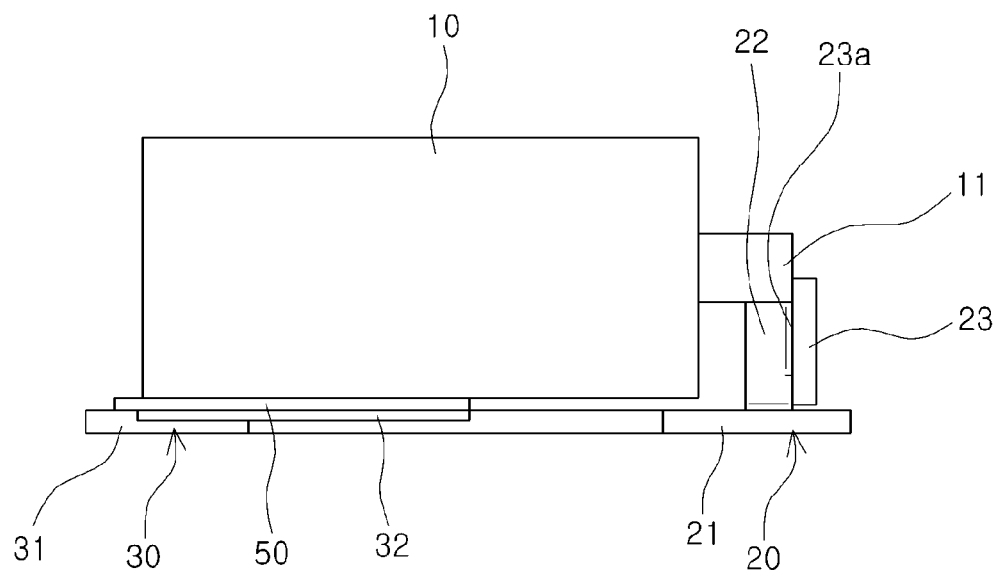

Referring to FIG. 4C, next, the positive and negative electrode lead frames 20 and 30 may be disposed in parallel to face each other.

In this case, if necessary, a heat resistant tape (not shown) may be attached to lower surfaces of the positive and negative electrode lead frames 20 and 30 to be connected to each other.

The heat resistant tape may be provided to prevent surfaces of the positive and negative electrode lead frames 20 and 30 from being contaminated during a molding process to be subsequently performed.

Next, the capacitor body 10 containing a tantalum powder and having the tantalum wire 11 exposed to one end surface thereof may be mounted on the negative electrode connection part 32 of the negative electrode lead frame 30.

In this case, the tantalum wire 11 of the capacitor body 10 may be connected to the inner surface of the positive electrode connection part 23 of the positive electrode lead frame 20.

That is, the tantalum wire 11 and the positive electrode lead frame 20 may be electrically connected to each other by spot welding or laser welding the tantalum wire 11 and the positive electrode connection part 23 to each other or applying a conductive adhesive to the tantalum wire 11 and the positive electrode connection part 23 in a state in which tantalum wire 11 of the capacitor body 10 is connected to the inner surface of the positive electrode connection part 23 of the positive electrode lead frame 20.

Meanwhile, prior to the mounting of the capacitor body 10 on the negative electrode connection part 32, applying a conductive adhesive to an upper surface of the negative electrode connection part 32 of the negative electrode lead frame 30 to form the conductive adhesive layer 50 may be performed, such that adhesive strength between the capacitor body 10 and the negative electrode lead frame 30 may be improved.

The conductive adhesive may contain an epoxy-based thermosetting resin and a conductive metal powder. The conductive adhesive layer 50 may be formed by a dispensing method using a predetermined amount of the conductive adhesive or a dotting method using the conductive adhesive, such that the capacitor body 10 and the negative electrode connection part 32 may be attached to each other. Then, a hardening process is performed thereon at 150 to 170° C. for 40 to 60 minutes in a closed oven or under reflow hardening conditions, such that the conductive adhesive layer may serve to allow the capacitor body 10 not to move at the time of molding the resin.

In this case, as the conductive metal power, silver (Ag) may be used, but the present disclosure is not limited thereto.

Figure 4D:
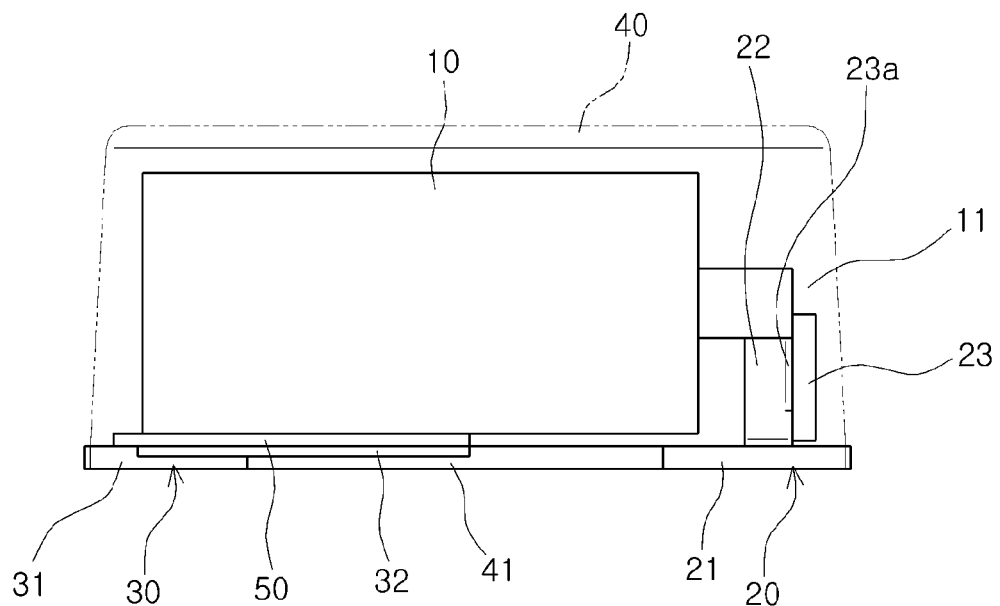

Referring to FIG. 4D, next, the molding part 40 may be formed by transfer molding a resin such as an epoxy molding compound (EMC), or the like, in order to enclose the tantalum wire 11 and the capacitor body 10.

In this case, a temperature of the molding may be about 170° C., and the temperature for EMC molding and other conditions may be appropriately adjusted according to components and a form of the EMC.

After molding, if necessary, the hardening process may be performed at about 160° C. for 30 to 60 minutes in the closed oven or under the reflow hardening conditions.

At this time, a molding process may be performed such that the lower surface of the negative electrode terminal part 31 of the negative electrode lead frame 30 and the lower surface of the positive electrode terminal part 21 of the positive electrode lead frame 20 are exposed to the outside.

Thereafter, when the formation of the molding part 40 is completed, the heat resistant tape attached to the lower surfaces of the positive and negative electrode lead frames 20 and 30 may be removed, and a deflash process for removing flashes generated during the molding process may be further performed.

In addition, laser marking may be performed in a state in which the positive and negative electrode lead frames 20 and 30 are attached, such that a positive electrode direction of the tantalum capacitor and if necessary, the capacitance thereof may be marked.

Further, as a subsequent process, if necessary, an aging process may be further performed.

The aging process may serve to decrease electrical variation generated during an assembling process.

Thereafter, in order to form an electrode of a chip according to the intended design, a process of removing residual portions of the positive and negative electrode lead frames 20 and 30 may be performed, such that the tantalum capacitor is finally completed.

As set forth above, according to exemplary embodiments of the present disclosure, the length of the current path connected between the positive electrode lead frame and the negative electrode lead frame may be significantly decreased, such that the ESR of the tantalum capacitor may be decreased.

In addition, since the positive electrode connection part may be formed by inwardly bending portions of the positive electrode lead frame, the volume of the molding part corresponding to the exposed portion of the tantalum wire of the capacitor body may be significantly decreased, such that the size of the capacitor body may be increased by an amount equal to the decrease in volume of the molding part as described above, thereby increasing the capacitance.

Further, since a solder formed between a capacitor body and a negative electrode lead frame according to the related art may be omitted, the size of the capacitor body may be increased by an amount equal to an area of the solder omitted as described above, thereby increasing the capacitance.

Furthermore, the positive electrode connect part of the positive electrode lead frame has a significantly small variation from an intended design, such that connecting the tantalum wire to the positive electrode connect part may be facilitated according to the intended design, such that they may be easily welded together.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor comprising:
   a negative electrode lead frame;
   a capacitor body mounted on an upper surface of the negative electrode lead frame and containing a tantalum powder and having a tantalum wire protruding to one end surface of the capacitor body;
   a positive electrode lead frame including a positive electrode terminal part, a vertical support part vertically extended from one leading edge of the positive electrode terminal part, and a positive electrode connection part extended from the vertical support part toward the positive electrode terminal part and connected to the tantalum wire; and
   a molding part formed to allow a lower surface of the positive electrode terminal part of the positive electrode lead frame and a lower surface of the negative electrode lead frame to be exposed to an outside of the molding part, while enclosing the capacitor body.

2. The tantalum capacitor of claim 1, wherein the positive electrode lead frame has a groove part such that the molding part is formed between the positive electrode terminal part and the positive electrode connection part.

3. The tantalum capacitor of claim 1, wherein the positive electrode lead frame has a first extension part in a width direction of the capacitor.

4. The tantalum capacitor of claim 1, wherein the negative electrode lead frame has a jaw part formed on a portion of the lower surface thereof such that the molding part is formed thereon.

5. The tantalum capacitor of claim 1, wherein the negative electrode lead frame has a second extension part to increase a contact area thereof with the capacitor body.

6. The tantalum capacitor of claim 1, wherein the capacitor body and the negative electrode lead frame have a conductive adhesive layer formed therebetween.

7. The tantalum capacitor of claim 6, wherein the conductive adhesive layer contains an epoxy-based thermosetting resin and a conductive metal powder.

8. A method of manufacturing a tantalum capacitor, the method comprising:
   preparing a positive electrode lead frame having a positive electrode terminal part and a positive electrode connection part by, first, inwardly bending a portion of a first conductive metal plate to be erected in a vertical direction, and second, bending the first conductive metal plate such that the portion thereof erected in a vertical direction is inwardly disposed;
   preparing a negative electrode lead frame formed of a second conductive metal plate;
   disposing the positive and negative electrode lead frames in parallel to face each other;
   mounting a capacitor body, which contains a tantalum powder and includes a tantalum wire protruding to one end surface of the capacitor body, on an upper surface of the negative electrode lead frame, and connecting the tantalum wire of the capacitor body to the positive electrode connection part of the positive electrode lead frame; and
   forming a molding part by molding a circumference of the capacitor body using a resin in such a manner that a lower surface of the positive electrode terminal part of the positive electrode lead frame and a lower surface of the negative electrode lead frame are exposed to an outside of the molding part.

9. The method of claim 8, wherein the positive electrode lead frame includes a groove part formed between the positive electrode terminal part and the positive electrode connection part, such that the groove part is filled with a resin at the time of molding the resin, thereby forming the molding part.

10. The method of claim 8, wherein the positive electrode lead frame has a first extension part formed in a width direction of the capacitor.

11. The method of claim 8, wherein the negative electrode lead frame has a jaw part formed on a portion of the lower surface thereof, such that the jaw part is filled with a resin at the time of molding the resin, thereby forming the molding part.

12. The method of claim 8, wherein the negative electrode lead frame has a second extension part to increase a contact area thereof with the capacitor body.

13. The method of claim 8, further comprising: prior to the mounting of the capacitor body on the upper surface of the negative electrode lead frame, applying a conductive adhesive on the upper surface of the negative electrode lead frame to form a conductive adhesive layer.

14. The method of claim 13, wherein the conductive adhesive contains an epoxy-based thermosetting resin and a conductive metal powder.

* * * * *